United States Patent

[11] 3,627,135

[72] Inventor Gerald J. Goodman
    Chomedey, Laval, Canada
[21] Appl. No. 878,844
[22] Filed Nov. 21, 1969
[45] Patented Dec. 14, 1971
[73] Assignee Air Gest International Corp.
    Montreal, Quebec, Canada
[32] Priority Oct. 31, 1969
[33] Canada
[31] 066372

[54] SEPTIC TO AEROBIC SEWAGE TREATMENT CONVERSION APPARATUS
    7 Claims, 3 Drawing Figs.
[52] U.S. Cl. .................................................. 210/195, 210/221
[51] Int. Cl. .................................................. C02c 1/12
[50] Field of Search ....................................... 210/195, 220, 221

[56] References Cited
    UNITED STATES PATENTS
    2,574,685  11/1951  Baxter et al. ............. 210/221 X
    2,989,186  6/1961   Weis ........................ 210/221 X
    3,161,590  12/1964  Weis et al. ................ 210/221
    3,195,727  7/1965   Kibbee ..................... 210/221 X
    3,202,285  8/1965   Williams .................. 210/221 X
    3,228,526  1/1966   Ciabattari et al. ......... 210/221 X
    3,438,499  4/1969   Reckers .................... 210/195 X Primary Examiner—Michael Rogers
Attorney—Browdy and Neimark ABSTRACT: Apparatus for use in converting septic bacterial-action sewage systems to aerobic sewage treatment systems. The apparatus consisting of a baffle to be positioned within a septic tank structure, having inlet and outlet ports, in an inclined position dividing the tank into an aeration chamber adjacent the inlet port and a settling chamber adjacent the outlet port. At least one air diffuser mounted adjacent the lowermost portion of the baffle which is spaced from the bottom of the tank and a conduit connecting the air diffuser to an air compressor. With this arrangement and with air issuing from the air diffuser countercurrent flows are imparted to the sewage in the aeration and settling chambers whereby continuous and complete aeration and mixing of the sewage in the tank is accomplished. In further aspect the baffle is provided with structure for returning scum from the surface of the liquid in the settling chamber to the aeration chamber, and in a further aspect the baffle is longitudinally extensible to accommodate various size tanks.

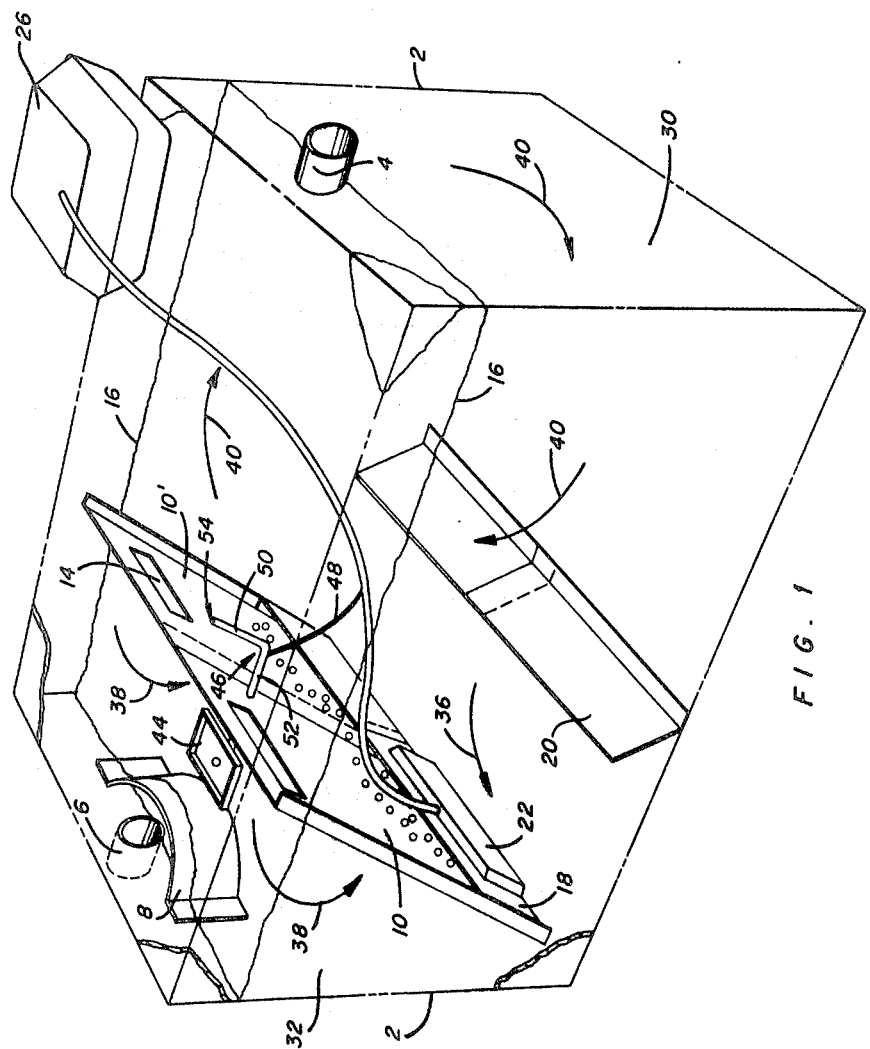

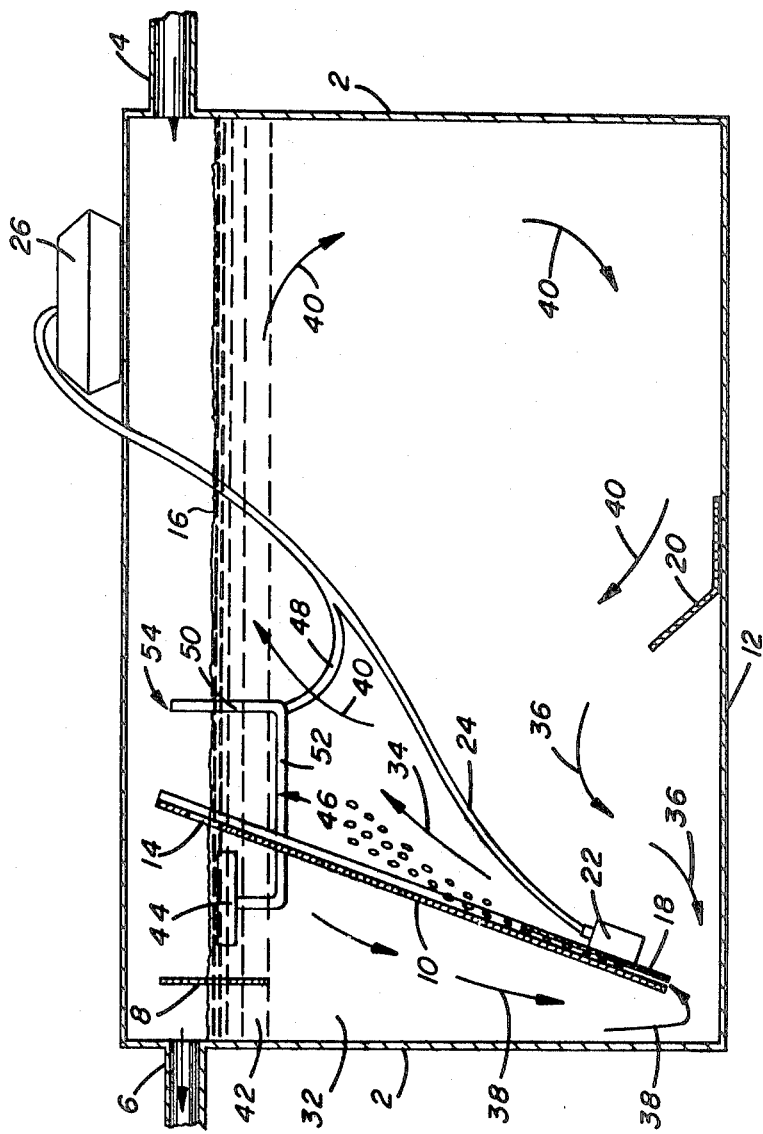

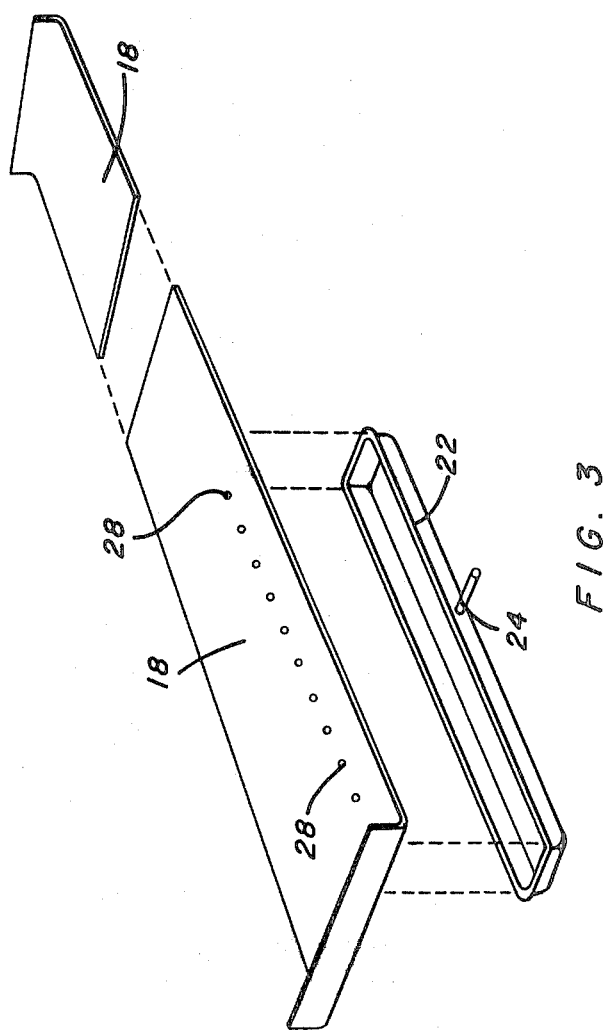

SEPTIC TO AEROBIC SEWAGE TREATMENT CONVERSION APPARATUS

The present invention relates to sewage treatment apparatus, and particularly to apparatus for converting anaerobic septic tank systems to efficient aerobic sewage treatment systems. The invention provides apparatus for installation in existing septic tank systems and also is already constructed septic tanks prior to the installation of the tank in the ground.

By far the most common method of treating sewage in rural and outlying districts and in some towns, is by way of septic tank systems. The sewage when emptied into the septic tanks is decomposed by anaerobic bacterial action in a properly functioning septic system, but as it is estimated that a great majority of all septic systems now in use are ineffectual in properly treating human wastes it is obvious that a more effective decomposition apparatus is required if further pollution of lakes and rivers is to be prevented.

As a result of recent Government investigation into pollution and the startling discoveries made, it is clear that the pollution problem must be overcome quickly, both with respect to pollution caused by industry as well as by pollution caused by single and multiple family septic systems.

With the pollution problem in mind it is the purpose of the present invention to provide apparatus at an economical cost to the purchaser for converting existing anaerobic septic systems to aerobic sewage treatment systems which is a much more efficient system as is well known.

Aerobic sewage treatment apparatus has been known for many years, but to the best of applicants' knowledge no attempt has yet been made to provide apparatus for installation in existing septic systems to convert the systems to efficient sewage treatment systems.

In addition the invention relates to conversion apparatus which, when installed, results in an aerobic sewage treatment system which is more efficient in operation and yet cheaper in cost than existing aerobic sewage treatment systems now available on the market. With the apparatus of the invention installed in an existing septic tank, maximum treating efficiency is obtained because the same apparatus which aerates the sewage also causes mixing and movement of sewage in the tank whereby all the sewage introduced into the tank is subjected to repeated settling, recirculation and aeration treatment before it is permitted egress from the tank in a satisfactorily treated condition.

Many attempts have been made to provide sewage treatment apparatus using aeration features, but all have been generally unsatisfactory in the view of the private user, either for reasons of cost of installation or maintenance or from the standpoint of overall inefficiency. Some known sewage aeration apparatus include movable paddles or wheels in the sewage tank, and apparatus which includes these movable component parts is to be avoided in view of initial cost and maintenance and repair demands.

Other known sewage treatment apparatus consists of a tank having two inclined parallel and spaced apart baffles with an air diffuser system therebetween. The compressed air issuing from the diffuser results in a circular flow of the sewage in an aeration compartment and a drawing of material from a settling compartment for introduction into the aeration compartment. However, in such systems one of the parallel baffles project upwardly from the bottom of the tank and the other projects sewage from the top with the result that the the flow into the air bubble stream is taken directly and only from the settling compartment with the result that there is no intimate mixing of sewage from both of the compartments at that point where the air agitation action is the greatest, which is directly adjacent the diffuser. As a result, the mixing and aeration of the sewage in the tank is not as complete as possible with the consequence that output from the tank is slowed and the capacity of the system is limited accordingly.

The present invention overcomes the aforesaid disadvantages by providing a sewage treatment apparatus for installation in existing septic systems which is economical in manufacture and which has no moving parts in the tank to malfunction, thus ensuring long life and trouble-free operation. In addition, the inventive apparatus provides for complete and continuous aeration of the sewage material in the tank and recycling and mixing of material from both an aeration chamber and a settling chamber together to cause complete aerobic decomposition of the sewage.

The main object of the present invention then is to provide apparatus to convert septic systems dependent upon anaerobic bacterial action to much more effective sewage treatment systems which treat human waste by aerobic action.

It is a further object to provide apparatus to convert septic systems to sewage treatment systems which is economical in manufacture and long-lasting and durable in use and which requires little or no maintenance.

It is still a further object of the invention to provide apparatus for installation into existing septic systems to convert the systems to efficient sewage treatment systems employing aerobic decomposition in a manner which promotes maximum treatment of the sewage by aeration.

It is a further object of the invention to provide a sewage treatment system for human waste consisting of a tank divided by an inclined baffle into an aerating chamber and a settling chamber, with an air diffuser provided adjacent the lowermost edge of the inclined baffle to provide an upwardly moving flow of bubbles to aerate the sewage material and to agitate and mix together sewage from the aeration chamber and the solids drawn from the settling chamber as a result of displacement of air by the diffuser to achieve maximum aeration of all of the sewage and decomposition of all of the solids contained in the tank.

These and other objects of the invention will become apparent from the following description of the accompanying drawings wherein:

FIG. 1 illustrates in perspective view a standard septic tank having portions of the side, end and top cut away for clarity, with the conversion apparatus of the invention positioned therein;

FIG. 2 is a side view partially in section of the drawing shown in FIG. 1; and

FIG. 3 is an enlarged perspective exploded view of the diffuser plate and air channel shown in FIGS. 1 and 2.

Referring now specifically to FIGS. 1 and 2, numeral 2 indicates a standard septic tank of generally rectangular or box design having an inlet 4 for water-borne sewage and remotely positioned outlet 6 for decomposed sewage and supernatant liquid. A baffle 8 is usually provided adjacent outlet 6 to prevent floating material from entering outlet 6. The tank 2 may be of metal, concrete or plastic construction, and may be of cylindrical or oval or other configuration, and the reference numerals 2, 4, 6 and 8 indicated above fairly represent a tank structure presently in use in known septic bacterial-action decomposition systems.

In septic systems raw sewage is introduced into the tank via inlet 4 which is connected to a sewage source by suitable piping (not shown), and the sewage simply separates in the tank and the accumulating solids await slow bacterial action and decomposition, and as is so often the case, the tank is "overworked" by the introduction of more sewage than can be handled with the result that raw sewage simply passes through the tank after having undergone little or insufficient treatment.

Aerobic decomposition action is of course quicker and more efficient than the slow-working anaerobic bacterial treatment and the installation of inexpensive aerobic sewage treatment apparatus will result in more complete and efficient treatment of the sewage while at the same time increasing the overall capacity of the system.

The conversion apparatus according to the present invention will now be described.

The apparatus consists of a baffle 10 mounted in an inclined position as shown within the tank 2 by any suitable means, such as by self-tapping screws, or bolts (not shown) if the tank is of metal construction. As will be clearly seen in FIGS. 1 and 2 the baffle 10 is spaced a distance above the bottom 12 (FIG. 2) of the tank, and slots 14 in the uppermost portion of the baffle enable sewage to flow both beneath and over (through slots 14) the baffle. The lower edge of the slots 14 are positioned just below the normal liquid level 16 in the tank. Of course the slots 14 could be eliminated with the top edge of the baffle being positioned just below the normal liquid level 16.

Inasmuch as existing septic tanks vary in width and shape and as it is necessary that the baffle 10 project completely across the tank, the baffle 10 may be longitudinally extensible as shown by portions 10 and 10' to be adjustable to the width of the tank. The two portions 10 and 10' may be slidably secured together in any suitable manner, but one simple expedient is simply to provide the longitudinal edges of one of the portions with U-turned flanges (not shown) to slidably receive the other portion.

The guide plate or diffuser plate 18 and the bottom baffle 20 which are discussed in more detail below are also extensibly adjustable to fit the inside of a tank as shown in the drawings.

Adjacent the bottom of baffle 10 a diffuser plate 18 (see also FIG. 3) is mounted parallel with, but spaced from (see FIG. 2) the lower planar surface of the baffle. The diffuser plate 18 may be secured to the baffle 10 by any suitable means such as by flanges, screws, welding or the like (not shown).

On the surface of the diffuser plate 18 remote from the baffle an air channel 22 (see also FIG. 3) is mounted and this channel is connected by tubing or by conduit 24 to an electric motor and air compressor combination shown compactly at 26.

The surface of the diffuser plate 18 facing the baffle 10 is provided with one or more longitudinal rows of holes or apertures 28 (see FIG. 3) with the result that when motor-compressor 26 is activated a stream of bubbles issue from the apertures, and flow upwardly beneath the inclined baffle to promote current flow in the sewage in the tank.

While an air channel 22 has been shown in the drawings as being provided only on one portion 10 of the baffle it is quite apparent that a diffuser plate and air channel and a tubing connection to motor-compressor 26 can also be secured to baffle portion 10'.

The positioning of the baffle 10 in the tank divides the tank into an aerating chamber 30 and a settling chamber 32.

The installation of baffle 10 and attachments including motor-compressor 26 into a tank converts the tank into an aerobic sewage treatment apparatus without additional equipment being necessary.

The motor and the compressor 26 may be mounted conveniently above the tank with an electric cable supplying electricity to the motor in the usual manner. While one motor only is contemplated, two could be supplied for standby service in the event of malfunction in the first, as the motor-compressor 26 is proposed to be in continuous service and not intermittent.

In operation aqueous borne sewage enters the tank through inlet port 4 into the aeration chamber 30. With motor-compressors 26 delivering air under pressure (the actual pressure used depending on the size of the unit) through the apertures 28 a curtain of upwardly rushing air bubbles is formed between the underside of the inclined baffle 10 and the diffusion plate 18 with the result that an upwardly directed current of bubbles and sewage material is created along the inclined baffle 10 in the direction of arrow 34 in FIG. 2. As a further result sewage material in the aerating chamber 30 moves in the direction of arrows 36 and sewage material in settling chamber 32 is drawn in the direction of arrows 38 to pass together upwardly through the bubble force chamber between the inclined baffle 10 and the guide or diffusion plate 18 where the material is completely agitated and aerated with decomposition and BOD-reduction being the end result. As the air diffusion is continuous, the sewage in the tank is endlessly being mixed, settled, circulated, aerated and decomposed. In the aeration chamber 30 the sewage material is continuously circulated as shown by the arrows 40, with portions flowing from the chamber 30 to the chamber 32 through slots 14, and portions continually entering the bubble force chamber in the directions of arrow 36.

It is the counterflow of currents 36 and 38 to meet and mix and be aerated between the inclined baffle and the diffusion plate 18 that constitutes the thorough aeration and decomposition of the sewage as a result of the present apparatus and which has not before been possible with known sewage treating apparatus.

As the sewage becomes aerated and decomposed by the actions discussed above, supernatant liquid and finely divided solids in suspension find their way to the comparatively quiet area 42 (see FIG. 2) behind baffle 8 in the settling chamber from where they flow from the septic tank via outlet 6.

As an additional and effective (but not necessary) portion of the apparatus a scum return arrangement may be provided communicating between the settling chamber and the aeration chamber. This scum return may consist of a scum tray 44 positioned just below normal liquid level 16 connected to a U-shaped piping system indicated generally at 46 which returns the scum from the tray 44 to the aeration chamber 30. This scum return is accomplished by providing an air pressure conduit 48 from the main conduit 24 to the upright scum return pipe 50 which creates a partial vacuum in the horizontal scum return pipe 52 and ambient air pressure on the scum in the tray forces the scum through the pipes 52 and 50 and out outlet 54 back into the aeration chamber for recirculation.

Also as an additional feature, and as shown in FIGS. 1 and 2, a separate baffle 20 can be provided laterally across the bottom of the tank to facilitate mixing and aeration in the aeration chamber, but the presence of baffle 20 is not necessary for a successful operation of the apparatus.

As indicated above the tank will likely be of metal or concrete construction, and while the converting apparatus such as the baffles 10 and 20 and scum return 46 may be of metal construction and the conduits of rubber, plastic or the like material, all of the converting parts (with the exception of the motor-compressor) may be constructed of suitable plastic or synthetic composition material which is strong, durable, corrosion-resistant and uneffected by pH conditions existing in the tank. The use of plastic compositions may also result in a lowering of construction costs.

Of course the motor-compressor unit may be regulated as to the amount of air pressure delivered to the diffuser, thereby determining the degree of aeration and mixing of the sewage in the tank.

The embodiments of the invention in which an exclusive property or privilege is claimed are defined as follows:

1. Apparatus for the conversion of a septic anaerobic sewage system to an aerobic system, wherein the anaerobic system to be converted includes a tank having an inlet and an outlet remote from the inlet and a baffle adjacent the outlet to prevent floating material from reaching the outlet, the conversion apparatus comprising:

a baffle of adjustable length for mounting within and completely across the tank spaced from the bottom thereof and inclined downwardly toward the outlet end to divide the tank into an aerating chamber adjacent the inlet and a settling chamber adjacent the outlet whereby sewage may flow over and beneath the baffle to provide communication between said aerating and settling chambers;

and a guide plate positioned adjacent the bottom portion of the baffle on the aerating chamber side, and spaced from said inclined baffle to provide a passageway therebetween, said guide plate being spaced above the bottom of said tank, and air diffuser means to inject air into said passageway spaced above the bottom of the tank and a conduit connecting said air diffuser to an air compressor and motor mounted exteriorly of the tank, the issuing of air under pressure from the air diffuser structure causing currents in the tank to move sewage from the aeration chamber and the settling chamber between said inclined baffle and said air diffuser to effect aeration and intimate mixing of the sewage from both chambers.

2. Apparatus according to claim 1, wherein the said guide plate consists of a diffuser plate extending completely across the tank, and said air diffuser means is mounted on said diffuser plate, and further comprising an air channel secured to the surface of the diffuser plate remote from the baffle structure, said conduit being connected to said air channel, and one or more longitudinal rows of apertures in the diffuser plate whereby air under pressure moves from the air channel through the apertures and into the space between the inclined baffle structure and the diffuser plate.

3. Apparatus according to claim 1 further comprising means for returning scum from the surface of the sewage in the settling chamber to the aeration chamber.

4. Apparatus according to claim 3 wherein the scum returning means consists of a scum tray for positioning below the surface of the sewage in the settling chamber and a U-shaped conduit extending from the scum tray through the baffle structure and terminating in a scum outlet formed above the sewage in the aerating chamber, and a conduit conveying air under pressure to the U-shaped conduit to move by partial vacuum scum from the scum tray to the scum outlet.

5. Apparatus according to claim 2, further comprising a bottom baffle for placement on the bottom of the tank and to project upwardly from the bottom of the tank and to extend completely across the tank and incline toward the inclined baffle structure, spaced substantially from the inclined baffle.

6. Apparatus according to claim 5, wherein said bottom baffle is longitudinally extensible to enable positioning in tanks of varying width.

7. Apparatus according to claim 1 wherein said baffle of adjustable length is formed in two sections longitudinally extensible with respect to each other, and an air diffuser structure positioned on each baffle section and a conduit from each air diffuser structure to said compressor.

* * * * *